United States Patent
Bittner, Jr.

(10) Patent No.: US 6,434,647 B1
(45) Date of Patent: Aug. 13, 2002

(54) REFLECTED-WAVE BUS TERMINATION

(75) Inventor: Ray A. Bittner, Jr., Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/321,478

(22) Filed: May 27, 1999

(51) Int. Cl.[7] .............................. G06F 13/00; H03B 1/00
(52) U.S. Cl. ...................... 710/100; 710/305; 327/108; 327/109; 327/344; 327/400
(58) Field of Search ............................. 710/100, 126, 710/128, 129, 101, 305, 125, 314, 313; 327/108, 109, 111, 112, 114, 124, 344, 400, 552, 553, 554, 555

(56) References Cited

U.S. PATENT DOCUMENTS

| 4,015,147 A | * | 3/1977 | Davidson et al. | 327/566 |
| 5,343,503 A | * | 8/1994 | Goodrich | 375/377 |
| 5,638,402 A | * | 6/1997 | Osaka et al. | 375/257 |
| 5,933,041 A | * | 8/1999 | Sessions et al. | 327/319 |
| 6,094,091 A | * | 7/2000 | Okajima | 327/540 |
| 6,166,902 A1 | * | 2/2001 | Liu | 361/685 |

OTHER PUBLICATIONS

Shanley et al., *PCI System Architecture*, 3rd Edition, 1995, pp. 39–52.

PCI Local Bus Specification, Revision 2.2, 1998.

* cited by examiner

Primary Examiner—Peter Wong
Assistant Examiner—Tim Vo
(74) Attorney, Agent, or Firm—Lee & Hayes, PLLC

(57) ABSTRACT

A PCI reflected-wave communications bus has a plurality of individual signal lines. Each signal line is terminated with a resistive-capacitive filter to partially dampen voltage wave reflections.

17 Claims, 1 Drawing Sheet

REFLECTED-WAVE BUS TERMINATION

TECHNICAL FIELD

This invention relates to computer buses, and more particularly to digital communications buses that rely on reflected-wave switching for their operation.

BACKGROUND OF THE INVENTION

Modem communications systems typically utilize some type of electronic bus system to provide data communications between various computer components. A bus system is characterized in terms of a number of different properties, including electrical properties, timing properties, and data communication protocols.

Physically, a computer bus comprises a set of signal lines that extend in parallel between multiple peripheral connectors or "slots." Peripheral devices, sometimes referred to as "expansion cards," can be plugged into the peripheral connectors. Examples of such peripheral devices include memory devices, mass storage interface devices, sound cards, graphics cards, other I/O cards, etc.

In many cases, the bus is part of a so-called "motherboard," which incorporates a microprocessor and other components for controlling operations on the bus. In other cases, the bus is implemented as a passive "backplane," and controlling components are located on a peripheral device plugged into one of the peripheral connectors. The individual signal lines of the bus system are driven by components on the motherboard and/or by similar components on different peripheral devices.

High-speed computer bus systems typically utilize either incident-wave switching or reflected-wave switching. Signal line drivers are designed in accordance with the type of switching being utilized.

To understand the difference between incident-wave switching and reflected-wave switching, consider the case where a signal line or trace is fed by a driver and is attached to a number of device inputs distributed along the signal line. At high data speeds, each signal line acts as a transmission line, and the electrical characteristics of the transmission line must be considered when evaluating signal characteristics.

A transmission line presents impedance to any driver attempting to drive a voltage change onto a voltage line, and also imposes a time delay in the transmission of the voltage change along the line. Thus, when a signal line driver changes its output from one logic level to another, a wave propagates down the signal line, past the various peripheral devices coupled to the bus. As the wavefront propagates down the line, each device it passes detects the new logic level. Thus, each device detects the logic change at the first incidence of the signal along the signal line—at the incident wave. The amount of time it takes to switch all of the inputs along the line to a given value is the time it takes the signal to propagate the length of the line.

Another effect of a transmission line is that it produces reflections at points of high impedance. In the case of an unterminated signal trace, both ends of the trace present very high impedances. Since a signal cannot proceed beyond these points, it turns around and is reflected back down the bus. During the return passage of the wavefront, this effectively doubles the voltage change seen on the trace at each device's input and at the driver that originated the wavefront. To prevent this, incident-wave buses typically use termination resistors on the ends of individual signal lines. The termination resistors dissipate the signal when it reaches the end of the signal line, and thereby prevent reflections. A termination resistor typically has a value equal to the transmission line impedance of the signal line itself. In some cases, resistive-capacitive termination circuits are used to terminate signal lines in incident-wave buses.

Although incident-wave switching results in the quickest possible switching of device inputs along a signal line, it has some negative aspects. One of the most significant disadvantages of incident-wave switching is that it requires relatively large drive currents. In addition, incident-wave switching is difficult to decouple, causes spikes on internal bond wires, increases EMI, and causes crosstalk with various components.

A reflected-wave bus reduces these problems by omitting termination resistors and using wavefront reflections to an advantage. A carefully selected, relatively weak output driver is used to drive the signal line halfway to the desired logic voltage. As the resulting wavefront passes each device input along the signal line, the voltage change is insufficient to register as a logic change. When the wavefront arrives at the unterminated end of the bus, however, it is reflected back and doubled. Upon passing each device input again during the wavefront's return trip down the signal line, the new logic level voltage is registered at each device. The wavefront is eventually absorbed by the impedance of the signal line and of any peripherals coupled to the line, and the driver eventually increases its voltage to the steady state voltage of the new logic level. This cuts driver size and surge current in half.

The PCI (Peripheral Connection Interface) bus is one popular example of a computer bus that utilizes reflected-wave switching.

One problem with reflected-wave switching is that various critical timing parameters and characteristics can change depending on the length of the bus and on different load conditions. As an example, reflections in a non-terminated bus can continue beyond the first reflected wave—an incident wave can be reflected numerous times, back and forth between the ends of the bus. Driver and input device impedances can be designed so that this "ringing" dies out quickly enough to avoid problems. However, different bus conditions (such as the number of load devices) can upset the balance obtained through the specification of bus impedances.

The PCI specification addresses this problem by strictly limiting bus length and the number of load devices. In this way, the bus design can be optimized for a limited range of conditions. In addition, the PCI specification recommends clipping diodes at each end of each signal line and at the signal line driver itself. The clipping diodes limit bus voltages to maximum upper levels and minimum lower levels, thereby limiting the intensity of reflected voltage waves. However, this method can lead to undesirable high-frequency noise.

SUMMARY OF THE INVENTION

In accordance with the invention, wave filters are used in a reflected-wave bus to partially dampen reflections. The wave filters are placed at each end of each signal line, and consist of low-pass RC filters. The low-pass RC filters have time constants such that an initial reflected wave is largely unaffected by a filter, but subsequent reflections are significantly damped. This allows reflected waves to be utilized for reflected-wave switching, while preventing continued ringing which might otherwise disrupt proper switching on the bus. Because of such RC filters, it is possible to design reflected-wave buses having longer lengths and higher loading than would otherwise be possible.

Although dampening waves in reflected-wave systems is contrary to accepted practice, the inventor has found it to be an advantage in certain cases in which strict physical compliance with bus specifications cannot be met.

DETAILED DESCRIPTION

Figure 1:
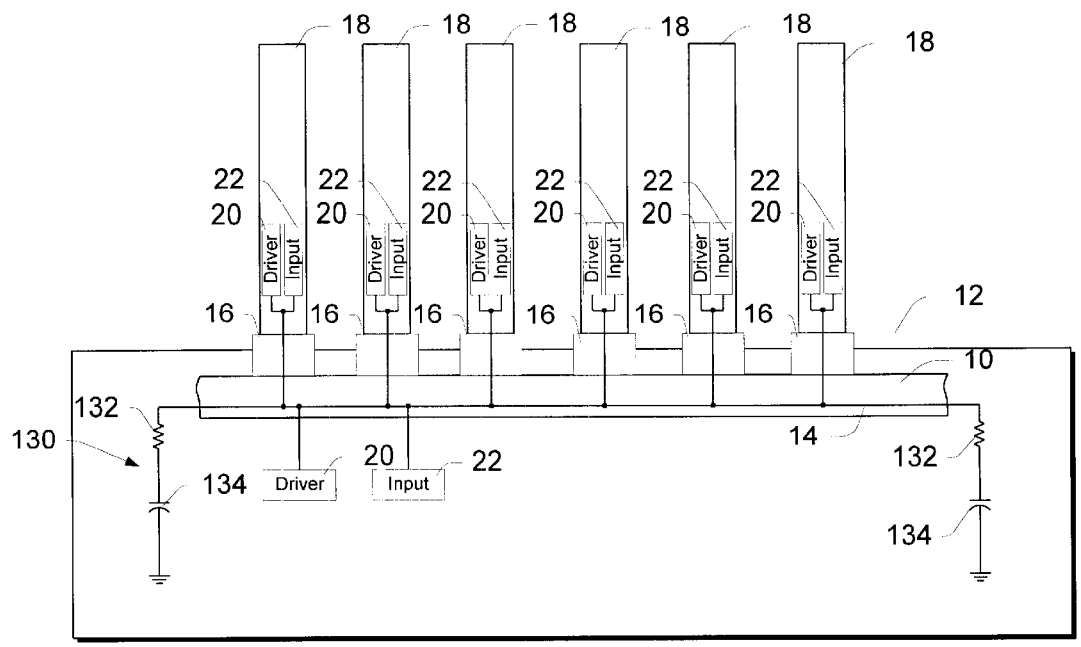
FIG. 1 is a block diagram of a reflected-wave computer system in accordance with the invention.

FIG. 1 illustrates a PCI reflected-wave bus computer system in accordance with the invention. In this embodiment of the invention, a digital communications bus 10 is integrated on a motherboard 12. The motherboard 12 contains a microprocessor and other base components of a computer, such as memory and some I/O components. The microprocessor communicates with other I/O components through PCI bus 10, utilizing protocols set forth in the PCI specification (available from PCI SIG, Hillsboro, Oreg.). Alternatively, the bus might be a CompactPCI bus, which is a variation of the PCI bus intended for industrial applications. The CompactPCI specification is available from PCI Industrial Computer Manufacturers Group (PICMG), a consortium of industrial computer product vendors.

PCI bus 10 includes a plurality of individual signal lines 14, only one of which is specifically shown for purposes of illustration. Peripheral connectors or slots 16 provide electrical connections between the bus and a plurality of peripheral devices or cards 18. Each peripheral connector 16 has a plurality of individual contacts (not shown), corresponding respectively to the signal lines of PCI bus 10. Most of the signal lines are connected in parallel to the plurality of peripheral connectors, although the bus contains a few lines that are dedicated to specific slots. Peripheral cards 18 are electrically connected to the PCI bus through the contacts of the peripheral connectors.

Note that while the described embodiment utilizes a conventional connector-type bus structure, the PCI bus and other reflected-wave buses may be used in other physical configurations, where peripheral devices are connected more permanently to the bus. For example, several components can be integrated on a single circuit board, and interconnected through a PCI bus structure without requiring electrical connectors.

The system of FIG. 1 includes a plurality of bus line drivers 20 that drive signal lines of the communications bus. The bus line drivers can be located on both motherboard 12 and on individual peripheral devices 18. The system also includes bus line input devices 22, again located on both the motherboard and on individual peripheral devices. In general, a plurality of drivers and input devices will be associated with each signal line of the bus, although only a single driver will be active on any given signal line at any particular time. For purposes of illustration, only the drivers and inputs associated with a single signal line are shown in FIG. 1.

The bus line drivers are reflected-wave-type drivers, designed and configured to rely on signal line voltage wave reflections to produce logic voltage level changes on the signal lines. Thus, the drivers are relatively weak drivers, which initially produce a voltage wave having insufficient magnitude to switch input devices on the signal lines. This initial or "incident" voltage wave is reflected upon reaching either end of the signal line, and thereby doubles the signal line voltage. As the reflected wave travels back along the signal line, the resulting doubled voltage is sufficient to switch the input devices on the signal line. With time, each driver increases the magnitude of its output to the desired steady state voltage, which is comparable to the reflected signal line voltage.

In accordance with the invention, wave filters in the form of resistive-capacitive (RC) filters 130 terminate the signal lines to partially dampen signal line voltage wave reflections without eliminating the signal line voltage wave reflections. A resistive-capacitive filter 130 is placed at each end of each signal line.

In one exemplary embodiment, the PCI bus includes six peripheral devices and has a length of over fifteen inches. However, the RC termination circuits 130 partially dampen signal wave reflections and thereby eliminate any false logic transitions that might otherwise be caused by repeated wave reflections.

Each RC termination circuit is designed with a time constant that is about 5 to 35% of the round-trip propagation time of the bus, depending on intended use. The described embodiment uses a time constant of about 20% of the round trip propagation time. Since the round-trip propagation time of the bus in the described embodiment is ten nanoseconds, the RC termination circuit has a value of about two nanoseconds. In actual implementation, the RC circuit comprises a resistor 132 in series with a capacitor 134. The resistor has a value of 47 Ohms, and the capacitor has a value of 47 pF. This results in a time constant of 2.209 nanoseconds.

When designing a bus in accordance with the practices described herein, an appropriate time constant can be derived by simulating two bus conditions. In general, worst-case reflections will be seen on a bus in which a driver is placed at one end of the bus, a load is placed at the next adjacent connection point and the rest of the bus is unloaded. The greatest reflections are seen when using drivers with the greatest drive strength and the drive strength of most PCI drivers is greatest on 1 to 0 transitions. With this configuration, an un-terminated bus of sufficient length, the second reflection of a signal transition will violate the maximum voltage requirements specified for use in timing measurement at section 4.3.5 of the PCI Specification (version 2.1).

The other extreme of bus operation is when the bus is filly loaded and being driven by a weak driver from one end of the bus. In this situation, the worst case propagation delay will generally be seen by simulating a 0 to 1 transition since PCI drivers are typically weakest when driving in that direction. If the rise time of the signal is insufficient, as defined by the maximum propagation delay measurement methods called out in section 4.3.5 of the PCI Specification (version 2.1), then the chosen time constant of the terminators must be reduced.

Although dampening waves in reflected-wave systems is contrary to accepted practice, the inventor has found it to be an advantage in certain cases in which strict compliance with bus specifications cannot be easily met.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer system comprising:
    a digital communications bus having a plurality of signal lines;
    a plurality of peripheral devices electrically coupled to the digital communications bus;
    the peripheral devices having bus line drivers that drive signal lines of the digital communications bus, the bus line drivers being configured to rely on signal line voltage wave reflections to produce logic voltage levels on the signal lines; and
    wave filters that terminate the signal lines to partially dampen signal line voltage wave reflections without eliminating said signal line voltage wave reflections.

2. A system as recited in claim 1, wherein the wave filters include a resistive element.

3. A system as recited in claim 1, wherein the wave filters include resistive and capacitive elements.

4. A system as recited in claim 1, wherein the wave filters are resistive-capacitive circuits.

5. A system as recited in claim 1, wherein the digital communications bus is a PCI (Peripheral Connection Interface) bus.

6. A system as recited in claim 1, wherein the digital communications bus is a CPCI (Compact Peripheral Connection Interface) bus.

7. A system as recited in claim 1, wherein the signal lines have terminating ends, and wherein each terminating end of an individual signal line has one of the wave filters.

8. A system as recited in claim 1, wherein:
    the wave filters are resistive-capacitive filters; and
    an individual signal line has a round-trip propagation time.

9. A system, comprising:
    a digital communications bus for use with bus line drivers that rely on signal line voltage wave reflections to produce logic voltage levels;
    a plurality of signal lines having line ends; and
    resistive-capacitive filters at the line ends to partially dampen signal line voltage wave reflections without eliminating said signal line voltage wave reflections.

10. A digital communications bus as recited in claim 9, wherein the digital communications bus is a PCI (Peripheral Connection Interface) bus.

11. A digital communications bus as recited in claim 9, wherein the digital communications bus is a Compact PCI (Compact Peripheral Connection Interface) bus.

12. A digital communications bus as recited in claim 9, wherein an individual signal line has a round-trip propagation time.

13. A computer system comprising:
    a digital communications bus having a plurality of signal lines;
    a plurality of peripheral devices electrically connected to the digital communications bus;
    the peripheral devices having bus line drivers that drive signal lines of the digital communications bus, the bus line drivers being configured to rely on signal line voltage wave reflections to produce logic voltage levels on the signal lines; and
    resistive-capacitive filters that terminate the signal lines to partially dampen signal line voltage wave reflections without eliminating said signal line voltage wave reflections.

14. A system as recited in claim 13, wherein the digital communications bus is a PCI (Peripheral Connection Interface) bus.

15. A system as recited in claim 13, wherein the digital communications bus is a CPCI (Compact Peripheral Connection Interface) bus.

16. A system as recited in claim 13, wherein the signal lines have terminating ends, and wherein each terminating end of an individual signal line has one of the resistive-capacitive filters.

17. A system as recited in claim 13, wherein an individual signal line has a round-trip propagation time.

* * * * *

UNITED STATES PATENT AND TRADEMARK OFFICE
CERTIFICATE OF CORRECTION

PATENT NO. : 6,434,647 B1
DATED : August 13, 2002
INVENTOR(S) : Bittner, Jr.

It is certified that error appears in the above-identified patent and that said Letters Patent is hereby corrected as shown below:

<u>Column 1,</u>
Line 10, replace "Modem" with -- Modern --.

<u>Column 4,</u>
Line 46, replace "filly" with -- fully --.

Signed and Sealed this

Third Day of December, 2002

JAMES E. ROGAN
*Director of the United States Patent and Trademark Office*